(12) United States Patent
Freeland

(10) Patent No.: US 10,244,357 B1
(45) Date of Patent: Mar. 26, 2019

(54) PROXIMITY ALERT MOBILE APPLICATION SOFTWARE

(71) Applicant: Sean Patrick Freeland, Atlanta, GA (US)

(72) Inventor: Sean Patrick Freeland, Atlanta, GA (US)

(*) Notice: Subject to any disclaimer, the term of this patent is extended or adjusted under 35 U.S.C. 154(b) by 0 days.

(21) Appl. No.: 15/715,533

(22) Filed: Sep. 26, 2017

(51) Int. Cl.
*H04W 4/029* (2018.01)
*H04W 4/02* (2018.01)
*H04W 68/00* (2009.01)

(52) U.S. Cl.
CPC ........... *H04W 4/027* (2013.01); *H04W 4/029* (2018.02); *H04W 68/005* (2013.01)

(58) Field of Classification Search
CPC .................................................. H04W 4/029
USPC ................................. 455/404.1, 404.2, 456.1
See application file for complete search history.

(56) References Cited

U.S. PATENT DOCUMENTS

| | | | |
|---|---|---|---|
| 8,788,176 B1 * | 7/2014 | Yopp ................... | B60W 30/095 701/300 |
| 9,674,664 B1 * | 6/2017 | Laursen ................ | H04W 4/023 |

* cited by examiner

*Primary Examiner* — Chuck Huynh

(57) ABSTRACT

PROXIMITY ALERT MOBILE APPLICATION SOFTWARE. is disclosed. The Proximity Alert Mobile Application relies on existing mobile devices and system technologies common to most people. Additionally, the Proximity Alert Mobile Application alerts all users of the application when proximity violations occur so all effected parties can take action.

1 Claim, 3 Drawing Sheets

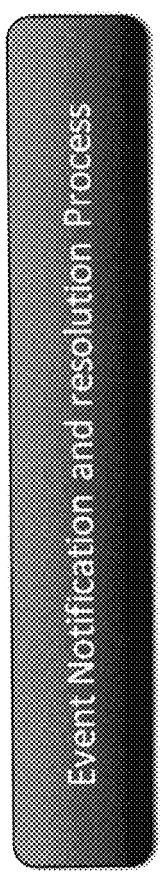
Fig 9 — Event Notification and resolution Process
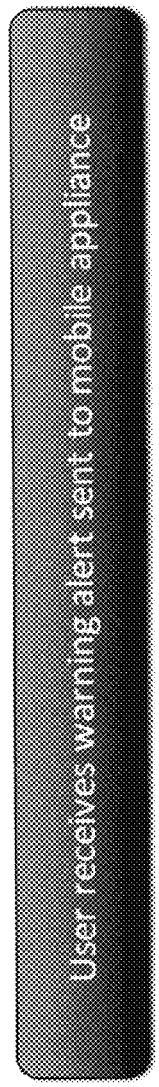
Fig 10 — User receives warning alert sent to mobile appliance
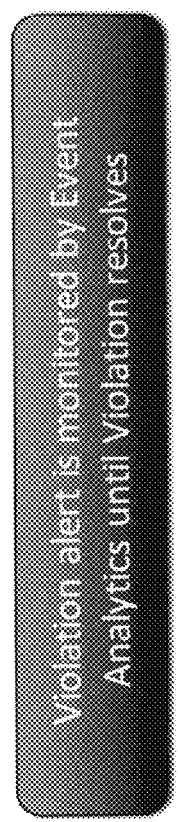
Fig 11 — Violation alert is monitored by Event Analytics until Violation resolves
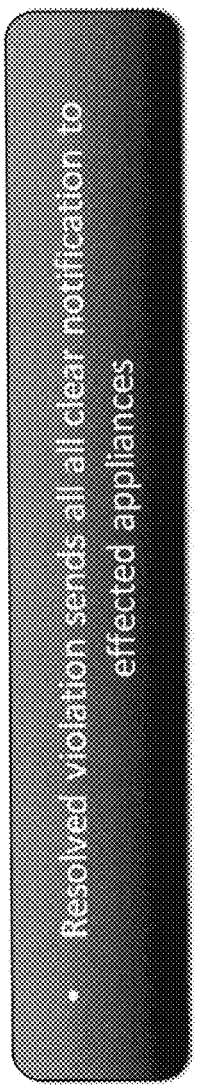
Fig 12 — Resolved violation sends all all clear notification to efected appliances

PROXIMITY ALERT MOBILE APPLICATION SOFTWARE

BACKGROUND OF THE INVENTION

Problem Solved

To help prevent unwanted interactions or collisions between users.

Other systems are designed with additional required hardware and software to make proximity determinations at high cost and large size, making them impractical for most users.

The Proximity Alert Mobile Application relies on existing mobile devices and system technologies common to most people. Additionally, the Proximity Alert Mobile Application alerts all users of the application when proximity violations occur so all effected parties can take action.

DETAILED DESCRIPTION OF THE INVENTION

Figure 1:
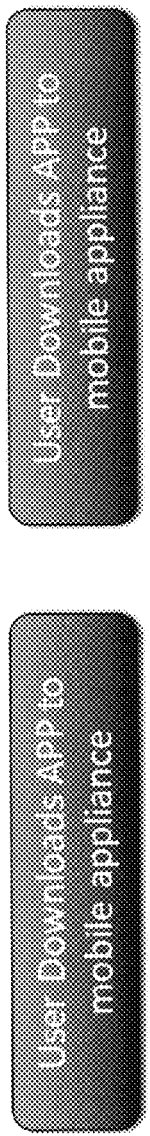
FIG. 1.
User downloads APP and Logs on
FIG. 2
Logged in user is identified on local map utilizing mapping database
FIG. 3
System logs all users onto map local map grid
FIG. 4
System identifies each logged in user and tracks, in real time, movement on the grid
FIG. 5
System identifies potential safety issues of potential unsafe proximity based on velocity and distance through specialized algorithms and internal device feedback
FIG. 6
Apps are notified of Potential danger
FIG. 7
System determines if violation of algorithm has occurred and if there is a need to notify user
FIG. 8
If violation of algorithm has occurred a message is created within the system
FIG. 9
Warning message is created in the system and sent to each appliance in real time
FIG. 10
Appliance notifies user of potential danger through notifications
FIG. 11
Event continues to be monitored until violation is resolved
FIG. 12
Once violation has been resolved the system sends an "all clear" notification to each effected appliance
Figure 2:
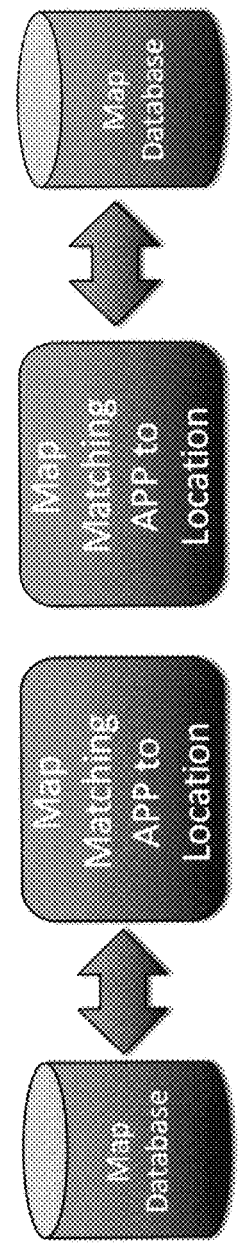
Figure 3:
Figure 4:
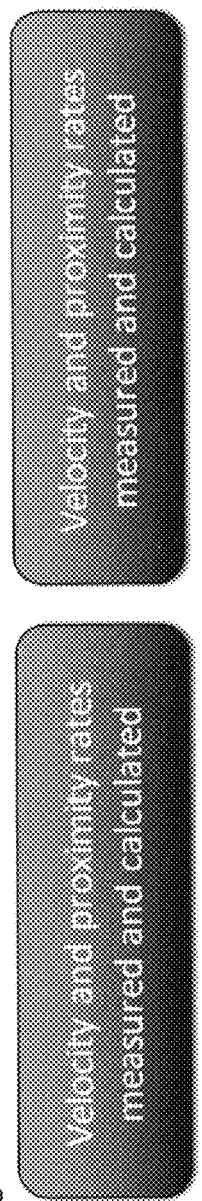
Figure 5:
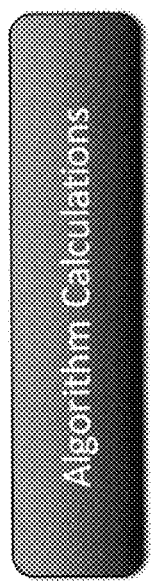
Figure 6:
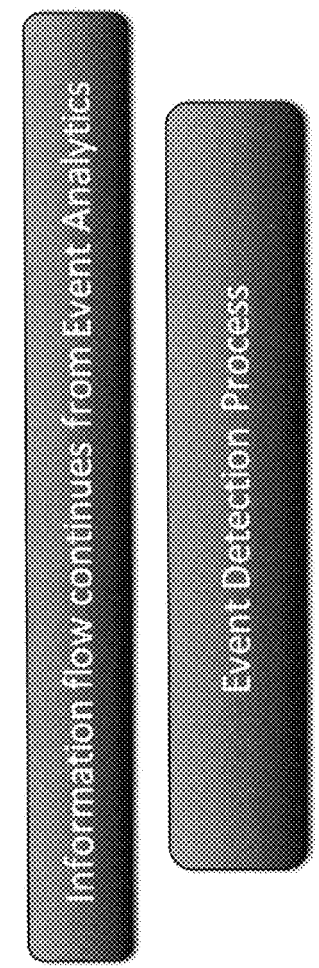
Figure 7:
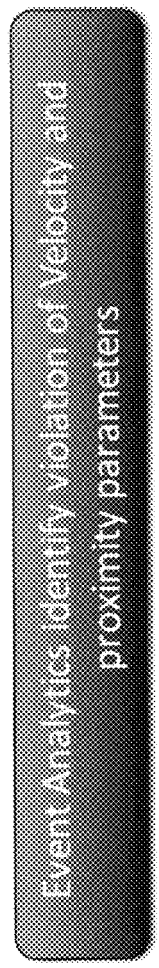
Figure 8:
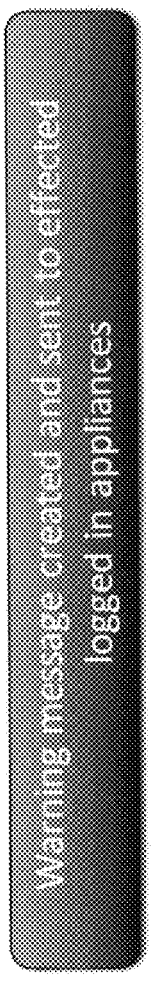

As stated above, to help prevent unwanted interactions or collisions between users. The invention claimed here solves this problem.

The Proximity Alert Mobile Application Software uses mapping and other embedded device software in the operating system of mobile devices, along with our unique additional software and processes, to locate the users of the software who are in motion in a specified geographic area. The Proximity Alert Mobile Application Software developed under this patent application will use a unique software and processes based on user velocity (The time rate of change of position of a body in a specified direction) and when the parameters of the software and processes are violated a notification is sent through this system to those users that are impacted by the violation allowing them to take action to prevent any unwanted interaction or collisions.

The claimed invention differs from what currently exists. Previously individuals who are in motion would have to rely solely on their perception of their environment to detect potential unsafe interactions or collisions. A person's ability to perceive these environmental conditions is fallible by the very nature of a human's ability to detect possible dangerous situations. This software improves user situational awareness of environmental conditions This invention is an improvement on what currently exists. Previously individuals who are in motion would have to rely solely on their perception of their environment to detect potential unsafe interactions or collisions. A person's ability to perceive these environmental conditions is fallible by the very nature of a human's ability to detect possible dangerous situations. This software improves user situational awareness of environmental conditions These systems do not commonly engage in communication between two objects in motion relating to potential unwanted interactions or collisions.

The Proximity Alert Mobile Application relies on existing mobile devices and system technologies common to most people. Additionally, the Proximity Alert Mobile Application alerts all users of the application when proximity violations occur so all effected parties can take action.

The Version of the Invention Discussed Here Includes:

1. Download The Proximity Alert Mobile Application
2. Users identified on Mapping Database.
3. System logs all users onto a geographical map.
4. System identifies logged in users and tracks their location in real time.
5. System identifies potential unsafe interactions or collisions through unique velocity based process.
6. System interacts with individual Apps to acknowledge potential negative interactions or collisions.
7. System determines if violation has occurred and if there is a need to notify user.
8. If violation has occurred a notification is created in the system.
9. Warning notification is sent to user's mobile device in real time.
10. The Proximity Alert Mobile Application then displays notification on user's mobile device advising of potential unsafe interactions or collisions.
11. System continues to monitor event until violation is resolved.
12. Once violation has been resolved system sends "All Clear" notification to each affected mobile device.
13. A mobile device or phone that allows for third party native applications to be installed, GPS functionality, native core motion operating system, ability to receive alerts, interactive screen and standard telecommunications ability.
14. Subject device readable medium (the Application Software)
15. The subject computer ecosystem server environment comprising of databases, servers, load balancers and all required I.P. interfaces, etc. (The Server)
16. The subject computer ecosystem readable medium (The Server Software)

Relationship Between the Components:

User downloads (1) The Proximity Alert Mobile Application (14) onto their mobile device (13). All users of The Proximity Alert Mobile Application (14) are then identified on The Server (15) and The Server Software (16). The Server (15) and The Server Software (16) then identifies all users on a Geographical Map (3) by utilizing communication between the Mobile Device (13), The Proximity Alert Mobile Application (14), The Server (15) and The Server Software (16). Users then log in to The Proximity Alert Mobile Application (14) on the Mobile Device (13) so that the user becomes actively recognizable in The Server System (15) (16). The System (13) (14) (15) (16) identifies each individual logged in user and tracks their location in real time in a specified Geographical Area (4). The System (13) (14) (15) (16) then identifies potential unsafe interactions or collisions through a unique velocity based process (5) utilizing proprietary software (14) (16). The Server System (15) (16) then interacts with each individual application (14) on a user Mobile Device (13) to acknowledge potential negative interactions or collisions (6). The System (13) (14) (15) (16) identifies and determines if a potential unsafe interaction or collision is occurring and therefore decides if there is a need (7) to notify user (13) (14). If The System (13) (14) (15) (16) identifies that a potential unsafe interaction or collision is occurring then a notification is created (8) in The Server System (15) (16). The Server System (15) (16) then sends that notification to the affected users Mobile Device (13) through The Proximity Alert Mobile Application (14) in real time (9). The Proximity Alert Mobile Application (14) then displays a notification on users Mobile Device (13) warning of potential unsafe interactions or collisions (10). The System (13) (14) (15) (16) continues to monitor the event until the potential unsafe interaction or collision is resolved (11). Once the potential unsafe interaction or collision has been resolved The Server System (15) (16) sends an "all Clear" notification to each affected Mobile Device (12) (13) through The Proximity Alert Mobile Application (14).

How the Invention Works:

Utilizing data from all APP users from the mobile device and the software to determine the time rate of change of position of a user in a specified direction and mapping that user to a specific geography, the System software will identify those users that are moving in a direction and at a rate of velocity so as to constitute a collision and notify users in that collision event by sending a notification and showing a beacon on the geographic map in which the event is occurring.

Once User is set up with (14) on his (13), he must set up specific settings on his device. These include Notifications, Ability to access GPS and core motion systems on (13) etc.

Additionally there is logic built into the system software (15) (16) to determine if potential negative interactions or collisions may be in process.

The system SOFTWARE (16) will then set up communications to the user as defined above (Previously).

How to Make the Invention:

To make this invention, one must craft software that is able to complete the requisite tasks and provide the user with the useful tool described here above.

In standard practice, all elements are necessary.

An enhanced visually perceptible module could be added to aid the aurally impaired user, while enhanced audio cues could be similarly added to aid the visually impaired user.

How to Use the Invention:

The user downloads the APP on their mobile device, signs up and logs in to the APP. In daily usage and moving around (either on foot, in a car on a bike, other transport, etc.), the APP, utilizing the software both on the device and in the APP server environment monitors the users motion, direction and speed and sends out alerts if another user of the APP has the potential to cause an unwanted interaction or collision. The user can view this on the mobile device screen or just wait for an ALERT to be sounded.

Additionally: Yes, this technology could be adapted for use with clothing or other wearable products or as implants to the body as long as there was the requisite readout platform.

The invention claimed is:

1. A method for monitoring a distance between device comprising of:
    providing a system including devices;
    identifying users who have logged onto the system through the devices;
    obtaining location data of the devices;
    identifying all devices on a mapping database, wherein the system logs all devices onto a geographical map tracking their location in real time;
    utilizing data from all devices to determine a time rate of change of position of the devices in a direction;
    identifying devices that are moving in a direction and at a rate of velocity, wherein the identifying constitutes an event;
    providing data as to the proximity between devices when the distance between devices reaches a threshold, thereby causes a safety concern;
    notifying devices of the event;
    wherein the system determines if notification of users through devices is necessary;
    sending a notification to users through the devices;
    showing a beacon on a geographic map on devices in which the event is occurring;
    displaying warning on devices to notify device users in real time;
    audio warning notification sent to devices to notify users in real time;
    monitoring the event until the proximity violation is resolved;
    continuing notification until the devices have passed each other in an opposite trajectory;
    determining that proximity violation has been resolved, wherein the system uses devices for notifying users through a notification indicating the proximity violation no longer exist.

* * * * *